(12) United States Patent
Rajakangas et al.

(10) Patent No.: US 7,928,679 B2
(45) Date of Patent: Apr. 19, 2011

(54) PROTECTION ARRANGEMENT OF AN ELECTRIC MOTOR

(75) Inventors: Kimmo Rajakangas, Karperö (FI); Paavo Merilinna, Vaasa (FI); Hans Carlsson, Vöyri (FI)

(73) Assignee: Vacon Oyj, Vaasa (FI)

( * ) Notice: Subject to any disclaimer, the term of this patent is extended or adjusted under 35 U.S.C. 154(b) by 548 days.

(21) Appl. No.: 11/902,156

(22) Filed: Sep. 19, 2007

(65) Prior Publication Data

US 2008/0074069 A1 Mar. 27, 2008

(30) Foreign Application Priority Data

Sep. 27, 2006 (FI) .................................... 20060861

(51) Int. Cl.
*G05D 23/00* (2006.01)
(52) U.S. Cl. ................... 318/473; 318/471; 318/445
(58) Field of Classification Search .............. 318/471, 318/473, 445; 361/27
See application file for complete search history.

(56) References Cited

U.S. PATENT DOCUMENTS

| | | | | |
|---|---|---|---|---|
| 4,954,923 A | * | 9/1990 | Hoeflich et al. | 361/111 |
| 5,061,884 A | | 10/1991 | Saganovsky | |
| 5,585,025 A | * | 12/1996 | Idland | 219/497 |
| 5,841,648 A | * | 11/1998 | Mansfield | 363/59 |
| 6,111,738 A | * | 8/2000 | McGoogan | 361/91.5 |
| 6,131,057 A | * | 10/2000 | Tamaki et al. | 701/22 |
| 6,142,741 A | | 11/2000 | Nishihata et al. | |

FOREIGN PATENT DOCUMENTS

| | | |
|---|---|---|
| JP | 3-36985 A | 2/1991 |
| JP | 11-239688 A | 9/1999 |
| JP | 2003-348883 A | 12/2003 |

* cited by examiner

*Primary Examiner* — Walter Benson
*Assistant Examiner* — David S Luo
(74) *Attorney, Agent, or Firm* — Birch, Stewart, Kolasch & Birch, LLP

(57) ABSTRACT

Thermistor monitoring arrangement of an alternating-current electric motor controlled by a power transformer, such as a frequency converter, for at least one thermistor monitoring the temperature of the motor, in which is a power transformer (200), in which is a power stage (203) and a control unit (204), controlling an alternating-current electric motor (201) provided with a thermistor (202), and into which power transformer, such as a frequency converter, an input circuit connected to a thermistor located in the motor is integrated, to which input circuit a safety circuit (a so-called Safe Stop circuit) that prevents unexpected starting or ensures safe stopping of the frequency converter is connected.

9 Claims, 2 Drawing Sheets

PROTECTION ARRANGEMENT OF AN ELECTRIC MOTOR

FIELD OF TECHNOLOGY

For safety reasons the temperature of motors situated in premises exposed to explosion hazard may not in any circumstances increase to be too high. The normal method to prevent overheating is to locate one or more temperature sensors (thermistor) in the motor for measuring the temperature and to disconnect the power supply of the motor immediately when dangerous overheat is detected. Numerous official regulations address this issue, which belong to the field of technology defined by the so-called ATEX directive on potentially explosive atmospheres.

The object of the present invention is a safety circuit of an alternating-current electric motor controlled by a power transformer, such as a frequency converter, which forms protection conforming to the standards, especial to the ATEX directive, in a situation of overheating of a motor.

PRIOR ART

The conventional way of implementing overheating protection of a motor controlled by a frequency converter is to use an external thermistor relay, which is connected either to the stop input of the frequency converter or to an external contactor which disconnects the whole electricity supply of the motor drive.

SUMMARY OF THE INVENTION

According to the invention an input circuit connected to a thermistor located in the motor is integrated into the power transformer, such as a frequency converter, to which input circuit a safety circuit (a so-called Safe Stop circuit) that prevents unexpected starting or ensures safe stopping of the frequency converter is connected.

By means of this invention the thermistor input can be incorporated directly into the frequency converter without a separate thermistor relay or other external control element of the thermistor, because when connected to the Safe Stop safety circuit the total solution stops an overheated motor safely.

From the standpoint of safety and of complying with official regulations, the essential aspect of the solution according to the invention is the reliability of disconnection of the power supply, which is ensured because the Safe Stop safety circuit complies with the official regulations and standards regulating the function in question, such as e.g. EN954-1, IEC61508 and IEC61800-5-2.

The characteristic features of the solution according to the invention are described in detail in the claims below.

SHORT DESCRIPTION OF THE DRAWINGS

Figure 1:
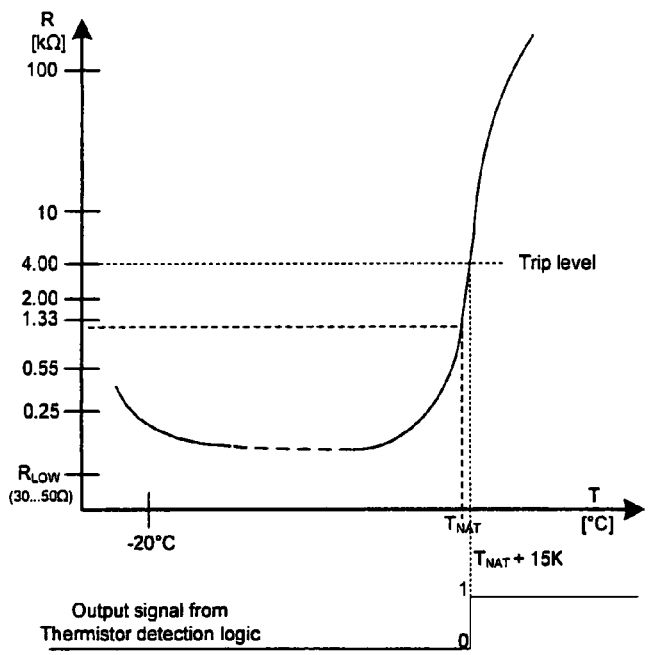

In the following, the invention will be described in more detail by the aid of an embodiment with reference to the attached drawing, wherein FIG. 1 presents a typical characteristic curve of a PTC thermistor resistor.

Figure 2:
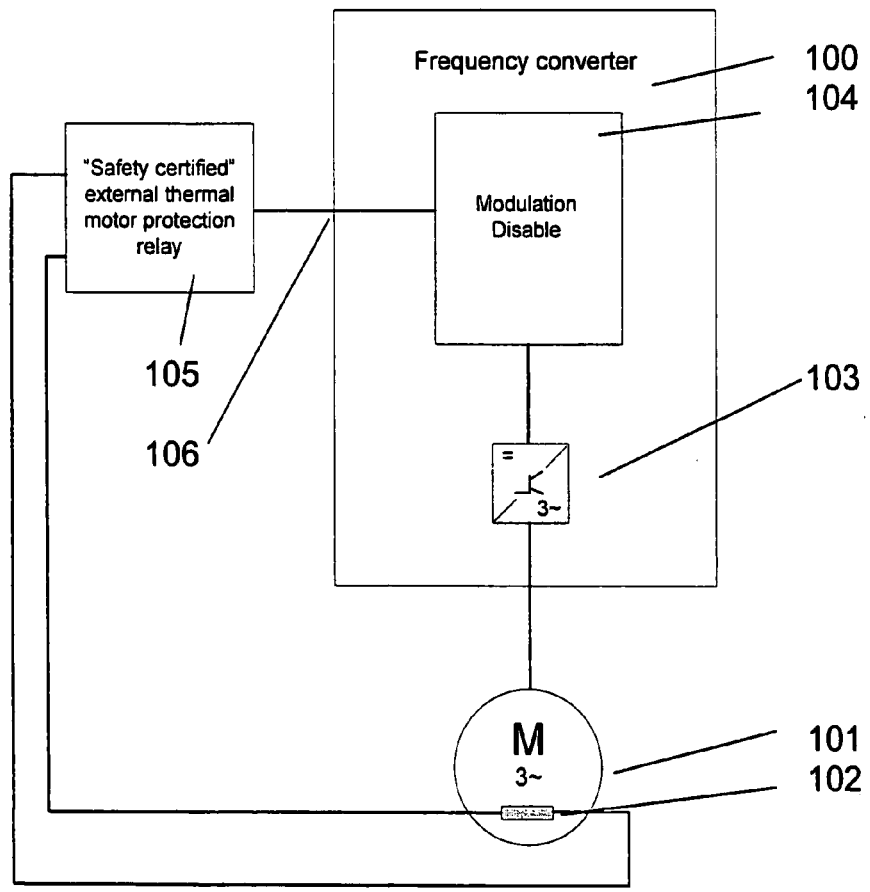

FIG. 2 presents a conventional solution for protecting a motor from overheat.

Figure 3:
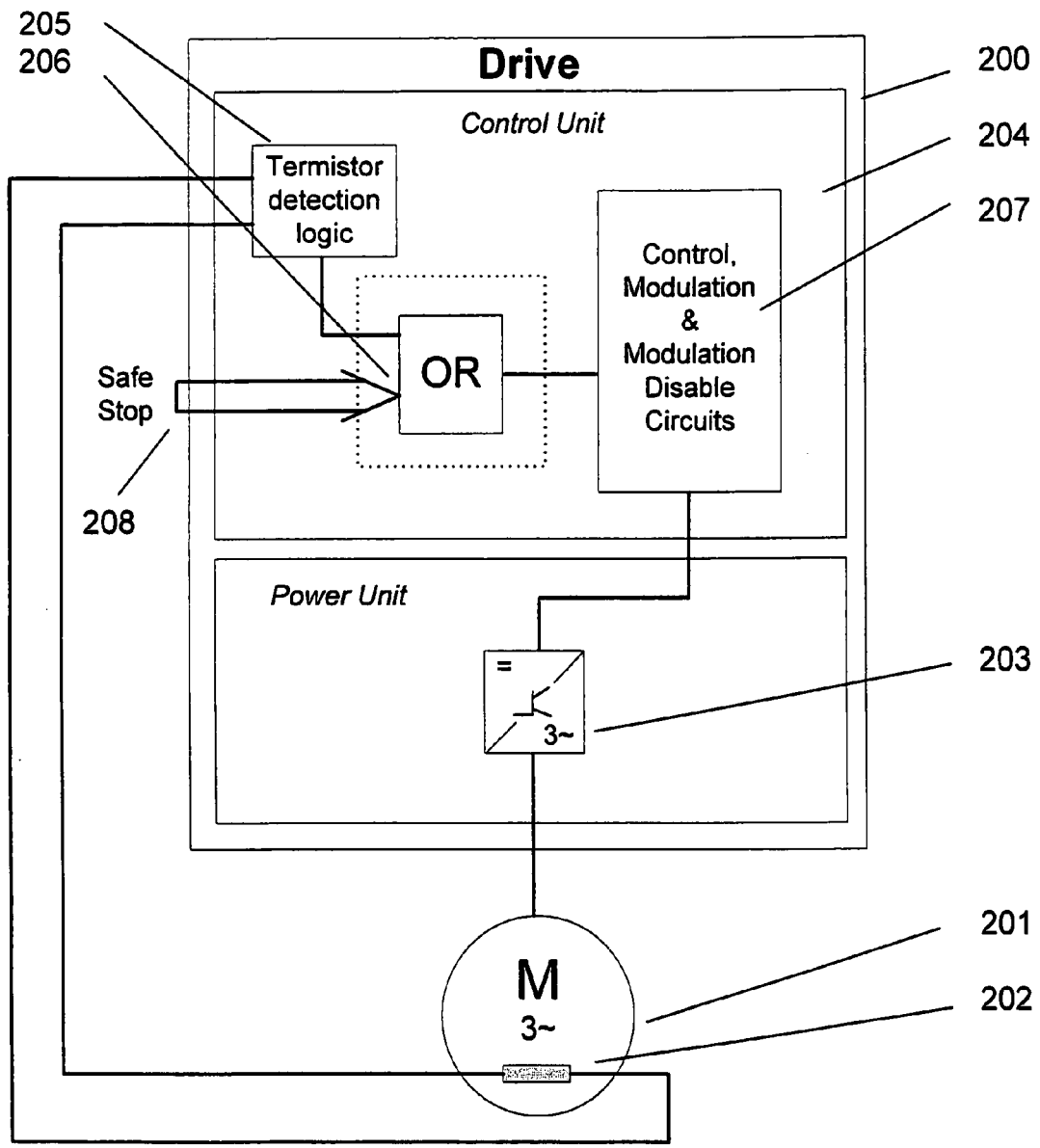

FIG. 3 presents the solution for protecting a motor according to the invention integrated into a frequency converter.

DETAILED DESCRIPTION OF THE INVENTION

FIG. 1 presents a typical characteristic curve of a PTC thermistor resistor, in which the resistance of the PTC thermistor resistor is presented as a function of temperature.

The thermistor is selected according to the desired overtemperature limit. Generally the overtemperature limit selected is $T_{NAT}+15$ K, which corresponds to a resistance of $\geqq 4$ kΩ. $T_{NAT}$ characterizes the point of sharp change of the characteristic curve of the PTC resistor, which is utilized for the purpose of protection and according to which the PTC resistor is normally selected.

Other than a PTC thermistor resistor can be used as a thermistor, e.g. a Pt100 temperature sensor, or other temperature sensors.

FIG. 2 presents a typical conventional solution controlled by a frequency converter and meeting the requirements of the ATEX directive, which sort is used to protect a motor situated in premises exposed to explosion hazard. In the solution a squirrel cage induction motor 101 provided with a PTC thermistor 102 is controlled by a frequency converter 100, in the power stage 103 of which are rectifying and inverting network bridges and load bridges as well as a control unit 104. The PTC thermistor disposed in the motor is connected to an external thermistor monitoring relay appliance 105, the activating output signal of which in an overtemperature situation is, for its part, connected to the stop inputs 106 of the frequency converter.

FIG. 3 presents a solution according to this invention, in which is a squirrel cage induction motor 201, provided with e.g. a PTC thermistor 202, and the frequency converter 200 controlling it, in the power stage 203 of which are rectifying and inverting network bridges and load bridges provided with semiconductor switches (e.g. IGBT) as well as a control unit 204. According to the principle of this invention the PTC thermistor 202 is connected directly to the frequency converter 200, and the detection logic 205 of the overtemperature limit of the thermistor is integrated directly into the frequency converter. The stop command given by the detection logic of the overtemperature situation of the thermistor is connected via the OR circuit 206 to the safety circuit 207 of the Safe Stop safety stop connection 208 or with similar, which implements the safe stop e.g. by preventing the controls of the IGBT switches of the power stage.

As the Safe Stop stopping function 207 preventing unexpected start-up implements the requirements according to standards EN954-1, IEC 61508 or IEC 61800-5-2 and the monitoring input circuit 205 of the thermistor integrated into the frequency converter meets e.g. safety level 1 (SIL 1) set by the standard IEC 61508, a reliable thermistor input ensuring a reliable stopping function is formed as a combination of these.

A temperature thermistor, which is needed in the scope of the ATEX directive to protect a motor situated in premises exposed to explosion hazard from overheating, can be connected directly to the frequency converter according to the invention. Thus an external thermistor relay is not needed.

In the example of FIG. 3 the safety circuit preventing the controls of the IGBT switches are incorporated in the control unit, which thus forms in its entirety a safety circuit for accidental start prevention with an integrated reliable thermistor input. The safety circuit can also be situated in the power stage.

It is obvious to the person skilled in the art that the different embodiments of the invention are not limited solely to the example described above, but that they may be varied within the scope of the claims presented below. The arrangement can be on one or more circuit boards in the frequency converter, and it can be in the control part (control unit), in the power part (power stage), or in a combination of both.

The invention claimed is:

1. A safety monitoring system for monitoring the temperature of an alternating-current electric motor operating in an explosive hazardous environment including a frequency converter controlling the motor, which comprises:
   a thermistor located in the electric motor,
   an input circuit integrated with a power transformer and connected to the thermistor, and
   a safety circuit of defined standards connected via an OR circuit to the input circuit of the thermistor for preventing accidental starting or ensuring safe stopping of the frequency converter based on the temperature of the electric motor.

2. The safety monitoring system according to claim 1, wherein the safety circuit is fitted to prevent the controls of semiconductor switches, e.g. IGBT, of the power transformer such that the thermistor input circuit is connected to the accidental start prevention and/or stop safety circuit of the semiconductor switches of the power transformer.

3. The safety monitoring system according to claim 2, which is fitted to one or more circuit boards in the power transformer.

4. The safety monitoring system according to claim 2, which is fitted to a control unit of the power transformer, to a power stage, or to both.

5. The safety monitoring system according to claim 1, which is fitted to one or more circuit boards in the power transformer.

6. The safety monitoring system according to claim 5, which is fitted to a control unit of the power transformer, to a power stage, or to both.

7. The safety monitoring system according to claim 1, which is fitted to a control unit of the power transformer, to a power stage, or to both.

8. The safety monitoring system according to claim 1, which is fitted to one or more circuit boards in the power transformer.

9. The safety monitoring system according to claim 1, which is fitted to a control unit of the power transformer, to a power stage, or to both.

* * * * *